April 30, 1935.   L. J. GRUBMAN   1,999,726
DOLL HEAD AND EYE SET AND MOUTH SET THEREFOR
Filed Nov. 26, 1932
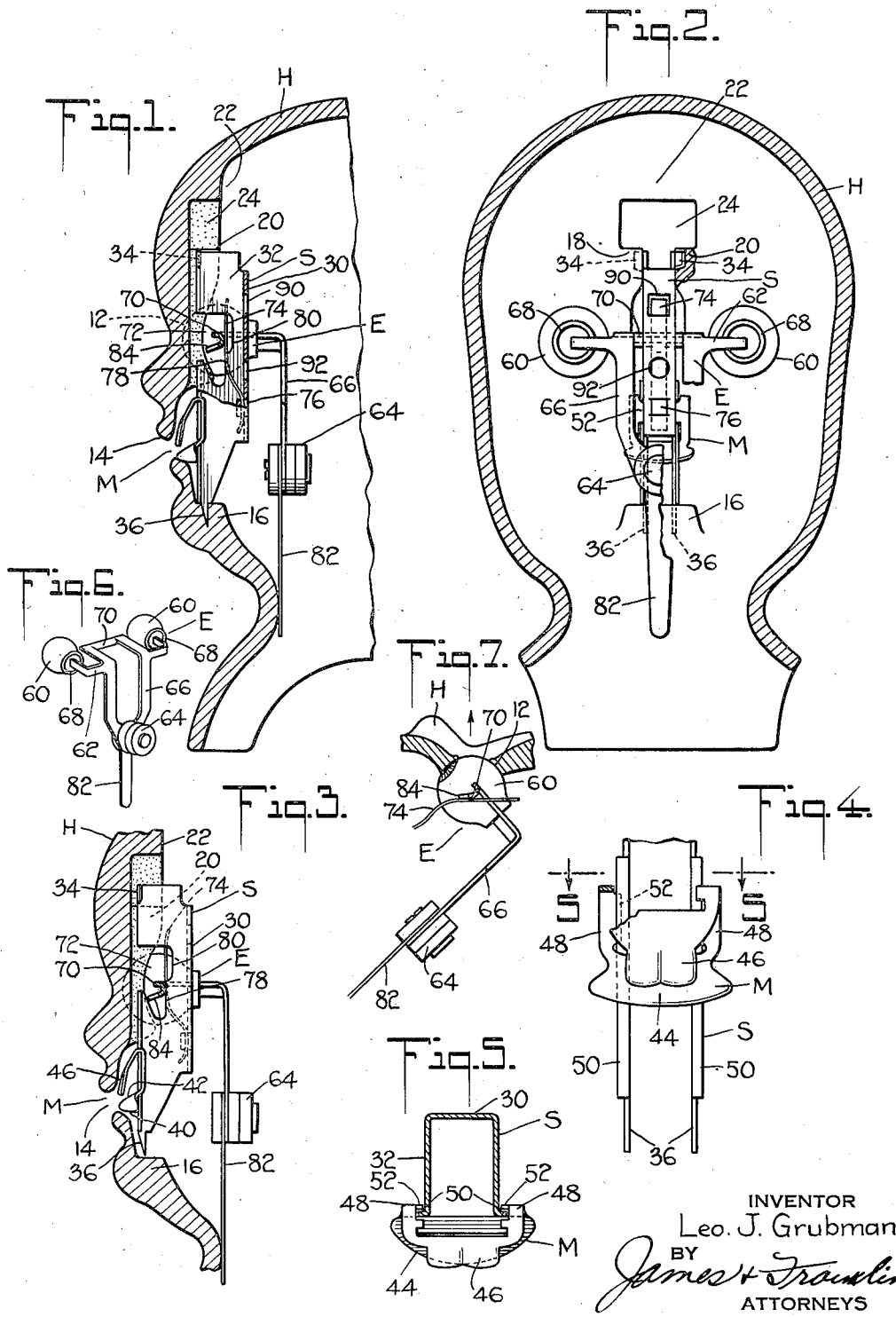
INVENTOR
Leo. J. Grubman
BY
ATTORNEYS Patented Apr. 30, 1935

1,999,726

UNITED STATES PATENT OFFICE 1,999,726

DOLL HEAD AND EYE SET AND MOUTH SET THEREFOR

Leo J. Grubman, Belle Harbor, N. Y., assignor to Margon Corporation, New York, N. Y., a corporation of New York Application November 26, 1932, Serial No. 644,457

19 Claims. (Cl. 46—40)

This invention relates to dolls, and more particularly to fittings such as an eye set or/and a mouth set adapted to be mounted in a doll head having appropriate corresponding eye openings or/and a mouth opening, as well as to a head equipped with such fittings.

Dolls are frequently provided with movable eyes which must be mounted in the head by appropriate mounting means secured thereto. Dolls of better grade are also provided with a mouth opening and a mouth set including a tongue and sometimes teeth, which mouth set has heretofore been separately attached to the head, thus necessitating another mounting operation. The primary and general object of the present invention resides in the provision of a single fitting which will include an appropriate support secured to the head and having mounted thereon both an eye set and a mouth set. A further object of my invention is to provide for a relative movement or adjustability of the spacing between the eye set and the mouth set support, so that the complete fitting will accommodate variation in head size and undesired but ordinarily inevitable inaccuracies in the spacing of the eye openings from the mouth opening of the head.

Further objects of the invention center about the manner in which the stationary support member of the fitting is secured to the head, and are: to provide a support member which may be securely and rigidly attached to the head by a simple movement of the same within the head; to so design the attaching means that the spacing of the support member from the front wall of the head will be adjustable and determined by the actual location of the eye openings in the head; even more specifically, to establish said spacing by actual positioning of the eye members in said eye openings when attaching the support to the head; and to provide a doll head having integrally formed therein during the original molding operation, appropriate abutments, recesses, and the like, for mating cooperation with said preferred form of eye set.

Further objects of the present invention center about the eye set mounting per se, and are: first, to slidably relate the eye set to the support so that the eye members may be positioned in the eye openings during the mounting movement of the support; second, to so relate the eye set and support as to provide stop means to positively limit rearward movement of the eye set relative to the support at the beginning of the mounting operation, yet to provide clearance permitting recession or freedom of movement of the eye members when the support is mounted in place; third, to provide for a resilient or yieldable movement of the eye set toward the eye openings, and a resilient or yieldable end stop for limiting the movement of the eye set, while utilizing only a single spring for both purposes; and fourth, to provide means for increasing the pressure with which the eye set is urged toward the eye openings when the eye set is in its closed position, thereby preventing an unsightly visible gap or shade line between the colored or eye lid portions of the eye members and the eye openings, this being accomplished despite the natural tendency of the operating weight to pull the eye members away from the eye openings when in their closed condition.

Further objects of the present invention center about the mouth set and are: first, to provide a mouth set which is slidably related to support means secured in the head as aforesaid; second, to provide a mouth set which will be natural in appearance; and, third, to provide a mouth set made in a simple and expensive manner from a single piece of material and integrally provided with appropriate means for slidably mounting the same on a support member.

To the accomplishment of the foregoing and such other objects as will hereinafter appear, my invention consists in the doll head, eye set, and mouth set elements, and their relation one to the other, as hereinafter are more particularly described in the specification and sought to be defined in the claims. The specification is accompanied by a drawing in which:

Fig. 1 is a vertical section taken through a doll head embodying features of my invention;

Fig. 2 is a section through the head, showing a rear view of the fitting mounted in the head;

Fig. 3 is a section generally similar to Fig. 1, showing the relative positions of the support, eye set, and mouth set at the beginning of the mounting operation;

Fig. 4 is an enlarged front view of the mouth set;

Fig. 5 is a section taken in the plane of the line 5—5 in Fig. 4;

Fig. 6 is a perspective view of the eye set; and

Fig. 7 is a detail explanatory of a feature of the invention.

Referring to the drawing, the complete fitting includes a support S stationarily mounted in the head H and carrying an eye set E and a mouth set M. It will be understood, however, that the support S may be used with either the eye set E or the mouth set M alone, in addition to the illustrated preferred form in which both the eye set and mouth are employed.

Considering the elements in greater detail, the head H may be molded of any appropriate material, and is provided with eye openings 12 and a mouth opening 14. The head is preferably further provided on its inner front wall with an abutment 16, preferably located in the lower portion of the head, and a pair of spaced abutments 18 and 20, preferably located at the upper portion of the head. The abutments 18 and 20 may be strengthened and the doll head shape simplified by extending the area of the rear faces of the abutments 18 and 20 sidewardly and upwardly until the curved outer wall of the head is met, thus forming the flat area indicated at 22 in the drawing. In such case, however, a recess 24 of ample size is formed just above the abutments 18 and 20, for reasons which will be apparent when describing the mounting of the support in the head. From another viewpoint, the resulting construction may be described by stating that the upper portion of the front head wall is thickened and that it is provided with a generally T-shaped slot or recess comprising the recess 24 and the subjacent spacing between the abutments 18 and 20.

The support S is preferably formed from a single piece of sheet metal bent into U or channel shape, as is most clearly evident from an inspection of Fig. 5, showing how the body of the support is made up of a rear wall 30 and side walls 32 bent into relatively rigid channel formation. The open side of the channel is positioned forwardly. When the support is mounted in the head, the forward open edges of the support are bent outwardly at the upper end thereof to form the ears or tangs 34, best shown in Fig. 2 of the drawing. The lower end of the support is provided with a pair of downwardly projecting tangs or prongs 36. It will thus be evident that the support may be mounted in the head by first positioning the support between the abutments 18 and 20, with the ears 34 located in the recess 24, as is clearly shown in Fig. 3 of the drawing, and then relatively moving the support and head so that the support is forced downwardly, thereby embedding the prongs 36 in the upper wall of abutment 16 and the ears 34 in the side walls of abutments 18 and 20. The support may be spaced as desired from the front wall of the head within limits determined by the thickness of abutments 16, 18, and 20.

The mouth set M is preferably formed from a single piece of sheet metal bent to provide a relatively flat bottom surface 40 and a rearwardly and upwardly sloping front surface 42, the resulting tongue member having an arcuate forward edge 44 when viewed in plan, as is best shown in Fig. 5. The upper part of the sheet metal is bent forwardly and downwardly to form teeth 46, these being colored white, in contrast with the tongue surface 42 which is colored red. Intermediate the tongue and teeth the center portion of the sheet metal is cut away so as to leave a pair of side arms 48 which interconnect the tongue and teeth and which are positioned rearwardly and appropriately shaped to form mounting means for slidably mounting the mouth set on the support S. For this purpose the forward edges of side walls 32 of support S are bent outwardly in the lower portion of the support to form guide rails 50, while the upper and lower ends of the arms 48 are slotted to receive the rails 50 while leaving inwardly projecting lugs 52 which extend in back of rails 50, as is best shown in Fig. 5 of the drawing. It will be evident, from an inspection of Figs. 4 and 5, that with this arrangement the mouth set is slidable along the support, and the sliding movement may, if desired, be made frictional because the side walls 32 of the support member resiliently resist compression toward one another, and a desired degree of frictional resistance to movement may be obtained by proper dimensioning of the mouth set relative to the normal spacing of the guide rails 50 of the support S.

In mounting the mouth set in the head, it is initially positioned on the support so as to come approximately adjacent the mouth opening 14 when the support is in its elevated position, as shown in Fig. 3. When the support is moved downwardly and impaled in the material of the head, the lower wall 40 of the mouth set bears against the bottom wall of the mouth opening and is there obstructed and retained while the support is moved downwardly to its final position, as is shown in Fig. 1 of the drawing. It will thus be evident that the slidable relation between the mouth set and support permits mounting movement of the support, and permits the mouth set to accommodate itself to variations in location of the mouth opening. It will further be evident that impaling the support in the head by a downward movement, instead of an upward movement, for example, is desirable because it brings the mouth set into contact with the lower edge of the mouth opening, which is itself the desired final position. This is so because a tongue member, to look natural, is preferably not disposed so as to project directly out of the middle of the mouth opening, but instead is disposed so as to lie in the lower part of the mouth and in back of the mouth opening.

The eye set E is composed of a pair of eye members 60 interconnected by a cross member 62 and provided with a depending operating weight 64 mounted on a weight arm 66. It will be understood that while an ordinary straight cross rod may be used if the eye members are of the hemispherical type, in the present case the eye members are of substantially spherical type, each eye consisting of an outer shell open at the rear, as indicated at 68, and filled with a suitable composition or plastic in which the ends of the cross member 62 are embedded, and that consequently the cross member in the present case is preferably of the double U form, as is most clearly shown in the small perspective view of Fig. 6. Referring to that figure, it may be pointed out that the cross member 62 and weight arm 66 are preferably formed integrally from a single piece of relatively heavy sheet metal, the depending weight arm 66 preferably being bifurcated, as shown, to clear the support member, and the U-shaped portions of the cross member being interconnected by a central bearing portion 70 the rear edge of which is rounded in a manner clearly evident from inspection of Figs. 1 and 2. The resulting construction is relatively strong and rigid inasmuch as the ends of the cross member are interconnected both by the bearing portion 70 and the depending weight arm 66, so that the cross member will hold its shape even if the eye members are oscillated slightly to adjust the same. It will be understood, of course, that the center of curvature of bearing 70 is made coincident with a line extending between the centers of curvature of the eye members, so that the latter may remain properly seated in the eye openings during oscillation of the eye set about the bearing 70.

The side walls 32 of the support member S are cut away or recessed, as is indicated at 72 in Figs. 1 and 3, to receive bearing 70 of the eye set. In the normal condition shown in Fig. 1, the eye members rest in and are supported by the eye openings, the eye set being resiliently urged into contact with said openings by a leaf spring 74 the flat portion of which is housed within support S and bears directly against bearings 70. Leaf spring 74 is preferably fixed to support S at one end, as by slitting and displacing a portion of the rear wall 30 of the support member to form a connection, generally indicated at 76. It will be noted from an inspection of Fig. 1, that the side walls of the support member are cut away beyond the normal position of spring 74, so as to permit of some yieldability or recession of the eye members.

As has already been explained, the spacing of support member S from the eye openings may be varied when mounting the same in the head, and it is desirable that the support member be positioned in the head at a spacing accurately determined by actually physically placing the eye members in the eye openings during the mounting operation. For this purpose it is necessary to block up the eye members relative to the support member during the mounting operation, so that the spring will not be unduly compressed and so that clearance will be provided for additional retraction or recession of the eye members after the support has been mounted in place. In many cases the mounting tool has been complicated or elaborated by the provision of suitable means for thus blocking up or locking the eye members with respect to the support. In the present case, appropriate means for this purpose are provided directly on the support itself. Specifically, the side walls of the support are stepped or cut away at two different levels, the lower and forward level acting as blocking means for the eye set. Thus, in Fig. 3, the surfaces 78 at each side of the support receive and positively stop the bearing 70 when the fitting is first applied to the head preparatory to mounting the same. When the support is moved downwardly relative to the head to assume the position shown in Fig. 1, the eye members remain in the eye openings and consequently the eye set is moved upwardly of the support. Bearing 70 then slides off the positioning surfaces 78 to the position shown in Fig. 1 in front of portions of the side wall which are cut away more deeply, as shown at 80, thereby providing clearance for permissive recession of the eye set. At the same time, the spring 74 is made effective and urges the eye set forwardly into the eye openings. It will thus be seen that the eye set is not only oscillatable on the support member, but is movable therealong, thus permitting the eye set to remain positioned in the eye openings during the mounting movement of the support. At the same time, variations in location of the eye opening are provided for. The resulting relative movement is itself taken advantage of to provide first a blocked-up or positive relation between the eye set and support, followed by a resilient or yieldable relation therebetween.

To limit the opening and closing movement of the eye members, the fitting is preferably provided with appropriate stop means. In the present case the opening movement of the eye set is limited by known means including a spring member 82 depending from weight 64 and bearing against a portion of the head, as shown in Fig. 1, when the eyes are in open position. The closing movement of the eye set is limited by novel means which provides a soft and yieldable stopping action without necessitating the use of a special spring for the purpose, the leaf spring 74 being used for a dual function. For this purpose the sheet metal of cross member 62 is provided with a lug or finger 84, and when the metal is bent to form bearing 70, the finger 84 is disposed in a forwardly directed position clearly evident from an inspection of Figs. 1 and 3. The angle of finger 84 is so adjusted that the finger lies flat against leaf spring 74 when the eyes have been moved to open position by weight 64, this position being schematically shown in Fig. 7. It will be evident that the limiting of movement is resilient and quiet, without, however, necessitating a special spring for the purpose.

At the same time, a new additional and important function is served by this arrangement of parts, because the cooperation of finger 84 and leaf spring 74 is such as to cause an increased spring pressure on the eye set toward the eye openings when the eyes are in closed position. It will be evident, on reflection or upon inspection of Fig. 7, that in the closed position, the eyes are pulled away from the eye openings by the direct weight of the operating weight 64. However, it is just at this time that closest fit between the eye openings and eye members is essential because any spacing or open shade line between the painted eye lid portion of the eye member and the eye opening is conspicuously visible and mars the appearance of the doll. This is so because a true eye lid is not a part of the eye ball, but is a part of the face, and when closed shows no line equivalent to that which exists between the eye ball and the eye opening when the eye is open. In the present arrangement, the eye set comes to its closed position, as shown in Fig. 7, before weight 64 has swung downwardly fully to its plumb or rest position, and consequently tends to move the eye set further than is permitted by the stop finger 84. This tendency to further oscillation causes bearing 70 to oscillate about the extremity or tip of finger 84, thereby developing a greatly augmented reaction by leaf spring 74 which consequently urges the eye members into close contact with the eye openings. The movement of the eye towards the socket is caused by the eccentricity of the tip of the finger 84 in relation to the center of the eye ball, and the weight of the pendulum itself causes the eye to move forward or upward when the doll is in a reclining position, even if finger 84 is arranged to react against a rigid surface instead of a spring.

The mode of mounting and the operation of the fitting may be summarized as follows. Support S is laid upon an appropriate tool adapted to extend through the neck opening of the head and provided with relatively movable parts one of which, preferably stationary, receives the support member and anchors the same against longitudinal movement, as by engaging the square opening 90 or/and the hole 92 of the support member, and the other of which, preferably the movable portion, includes a jaw which projects into recess 24 in the doll's head. The support member is, of course, equipped with an eye set or mouth set, or preferably, both. The head is placed over the tool and over the assembled fitting, and is moved downwardly until the eye members are located in the eye openings and the mouth set is located approximately in the mouth opening. The head may be pressed firmly downwardly at the eye openings, whereupon the actuating or spreader device on the tool is operated to cause relative movement of the head and support, one part of the tool pressing against the upper wall of recess 24 and moving the head outwardly away from the other part of the tool which holds the support member. The eye members and mouth set move as necessary with the head, and, when the support has been impaled in final position, the eye set and mouth set are properly located and ready for use.

In operation, the support is, of course, stationary, as is the mouth set. The eye set is oscillatable between open and closed positions, the open position being limited by leaf spring 82, and the closed position being limited by leaf spring 74 which at the same time constantly urges the eye members into engagement with the eye openings, and which provides increased pressure for this purpose when the eyes are in closed condition.

It is believed that the manner of constructing and the many advantages of my improved eye set or/and mouth set fitting for a doll's head will be apparent from the foregoing detailed description. It will further be appreciated that while I have shown and described my invention in a preferred form, many changes and modifications may be made in the structure disclosed, without departing from the spirit of the invention, defined in the following claims.

I claim:

1. A fitting to be mounted in a doll's head having a mouth opening, said fitting comprising a stationary elongated support member, means for securing the same in a doll's head in a position generally parallel to the front wall of the head, and a mouth set slidably mounted on said support member for movement along the support member.

2. A fitting to be mounted in a doll's head having a mouth opening, said fitting comprising a generally upright support member, means for securing the same in a doll's head, and a mouth set slidably mounted on said support member for vertical movement along the support member.

3. A combined eye set and mouth set fitting for use in a doll's head having eye and mouth openings, said fitting including a generally upright support member, means for securing the same in a doll's head near the front wall thereof, an eye set oscillatably mounted on said support member, and a mouth set slidably mounted on said support member so as to be positionable adjacent the mouth opening when placed in the head.

4. A combined eye set and mouth set fitting for use in a doll's head having eye and mouth openings, said fitting including a generally upright support member, means for securing the same within a doll's head near the front wall thereof, an eye set oscillatably mounted on and slidable longitudinally of said support member to be adjacent the eye openings when placed in the head, and a mouth set mounted on said support member and slidable longitudinally thereof to be adjacent the mouth opening when placed in the head.

5. A combined eye set and mouth set fitting for use in a doll's head having eye and mouth openings, said fitting including a generally upright support member, means for securing the same in a doll's head, an eye set oscillatably mounted on and slidable along said support member, and a mouth set mounted on and slidable along said support member.

6. A fitting for use in a doll's head having eye openings, said fitting including an eye set, support means for movably supporting the eye set in the eye openings, resilient means urging the eye set into engagement with the eye openings, and resiliently operable end stop means including stop means on the eye set so shaped as to bear against and thereby cooperate with the same resilient means that urges the eye set toward the eye openings in order to limit the movement of the eye set.

7. A fitting for use in a doll's head having eye openings, said fitting including an eye set having a depending weight, support means for movably supporting the eye set in the eye openings, and an end stop for limiting the movement of the eye set including means on the eye set which so engages reaction means on the support when the eye set approaches the limiting position that further attempted movement of the weight causes pressure of the eye set toward and against the full peripheries of the eye openings.

8. A fitting for use in a doll's head having eye openings, said fitting including an eye set having a depending weight, support means for movably supporting the eye set in the eye openings, resilient means in the form of a leaf spring for urging the eye set into engagement with the eye openings, and an end stop for limiting the closing movement of the eye set including a finger on the eye set which comes into flat or parallel engagement with the surface of the spring when the eye set is in closed position, whereby any further attempted movement of the weight is yieldably opposed and causes an increase in pressure of the eye set against the eye openings.

9. A fitting for use in a doll's head having eye openings, said fitting including a support member, an eye set, resilient means constantly urging said eye set toward the front of the support, said support having means to positively limit the movement of the eye set toward the rear of the support when locating the support in a doll's head, a portion of the support adjacent said limiting means being cut away rearwardly in order to permit of yielding movement of the eye set against the resilient means after the support means has been mounted in the doll head.

10. A fitting for use in a doll's head having eye openings, said fitting including a generally upright support member, an eye set, resilient means constantly urging said eye set toward the front of the support, mounting means operable by movement of the support to secure the same in the doll's head, said support having a portion adapted to act as a positive stop for preventing rearward movement of the eye set when locating the support in a doll's head, and an adjacent portion cut away rearwardly in order to permit of yielding movement of the eye set against the resilient means after the support means has been moved to mount the same in the doll head.

11. A fitting for a doll's head provided with eye openings and a mouth opening, said fitting including a stationary elongated support extending generally parallel to the front wall of the head, securing means on said support operated by moving the support longitudinally within the head, and a mouth set slidably mounted on said support, the slidable relation of the mouth set to the support permitting the mouth set to be positioned in the mouth opening of the head during the mounting movement of the support.

12. A fitting for a doll's head provided with eye openings, said fitting including a stationary elongated support extending generally parallel to the front wall of the head, securing means on said support operated by moving the support longitudinally within the head, an eye set slidable along said support, a bearing surface on said support adapted to positively limit rearward movement of the eye set during the first portion of the mounting operation, said support being cut away adjacent the bearing surface for a substantial distance to permit additional rearward movement of the eye set during the last portion of the mounting operation, and resilient means urging the eye set toward the front of the support, the eye set being at all times slidable along the support so that it may self adjustably locate itself in the eye openings.

13. A fitting for a doll's head provided with eye openings and a mouth opening, said fitting including a stationary support, securing means on said support operated by moving the support within the head, an eye set slidably mounted on said support, a mouth set slidably mounted on said support, and a bearing surface adapted to positively limit rearward movement of the eye set at the beginning of the mounting operation, said support being cut away adjacent the bearing surface to permit additional rearward movement of the eye set at the end of the mounting operation.

14. A fitting for a doll's head provided with eye openings and a mouth opening, said fitting including a generally upright support, securing means at the ends of said support operated by moving the support longitudinally within the head, an eye set slidably mounted on said support, a bearing surface adapted to positively limit rearward movement of the eye set at the beginning of the mounting operation, said support being cut away to permit additional rearward movement of the eye set at the end of the mounting operation, resilient means urging the eye set toward the front of the support, and a mouth set slidably mounted on said support, the slidable relation of the eye set and mouth set on the support permitting the eye set and mouth set to be positioned in the eye and mouth openings of the head during the mounting movement of the support.

15. In combination, a doll head and a mouth set support mounted therein, said head having a thickened front wall and an abutment spaced from said thickened portion, said thickened wall being provided with a T-shaped slot or recess, said support having a mouth set slidably mounted thereon and being provided with tangs embedded in the abutment and outwardly directed ears embedded in the side walls of the stem of the recess, the top of the recess being large enough to freely receive the ears at the beginning of the mounting operation, whereby said support may then be moved toward the abutment in order to embed the tangs in the abutment and the ears in the sides of the recess.

16. In combination, a doll head and a mouth set and eye set support mounted therein, said head having a thickened front wall at its upper portion and an abutment at its lower portion, said thickened wall being provided with a T-shaped slot or recess, said support having a mouth set and an eye set slidably mounted thereon and being provided with downwardly projecting tangs on its lower end embedded in the lower abutment and outwardly directed ears at its upper end embedded in the side walls of the stem of the recess, the top of the recess being large enough to freely receive the ears at the beginning of the mounting operation, whereby said support may then be moved toward the abutment in order to embed the tangs in the abutment and the ears in the sides of the recess.

17. A fitting for use in a doll's head having eye openings, said fitting including an eye set having a depending weight, support means for supporting the eye set in the eye openings, a reaction surface on the support means, and a bearing surface on the eye set eccentrically related with respect to the normal center of oscillation of the eye set and arranged to bear against the reaction means when the eye set approaches its closed condition, the aforesaid eccentric relation being so adjusted that attempted continued movement of the weight of the eye set causes the eye set to move toward the eye openings and to bear against the full peripheries thereof.

18. A fitting for use in a doll's head having eye openings, said fitting including a generally upright support member, an eye set including a pair of eyes, a cross-bar connecting the same, a gravity operated weight, and bifurcated means straddling said support and connecting the weight to the eye and cross-bar assembly, an upright spring mounted on said support and constantly urging the eye set toward the front of the support, the eye set being held in place normally by only the eye openings and the spring, said support being cut away around the cross-bar to permit free floating movement thereof yet providing stop means therearound to limit the permissible movement of the eye set should the same be forcibly dislodged against the resistance of the yieldable spring.

19. A fitting for use in a doll's head having eye openings, said fitting including a support member, an eye set including a pair of eyes, a cross-bar connecting the same, a gravity operated weight, and means connecting the weight to the eye and cross-bar assembly, a spring mounted on said support and constantly urging the eye set toward the front of the support, the eye set being held in place normally by only the eye openings and the spring, said support being cut away around the cross-bar to permit free floating movement thereof yet providing stop means therearound to limit the permissible movement of the eye set should the same be forcibly dislodged against the resistance of the yieldable spring.

LEO J. GRUBMAN.